A. B. BROLUSKA.
SLACK ADJUSTER FOR VEHICLE BRAKES.
APPLICATION FILED MAY 2, 1921.
1,409,996.
Patented Mar. 21, 1922.
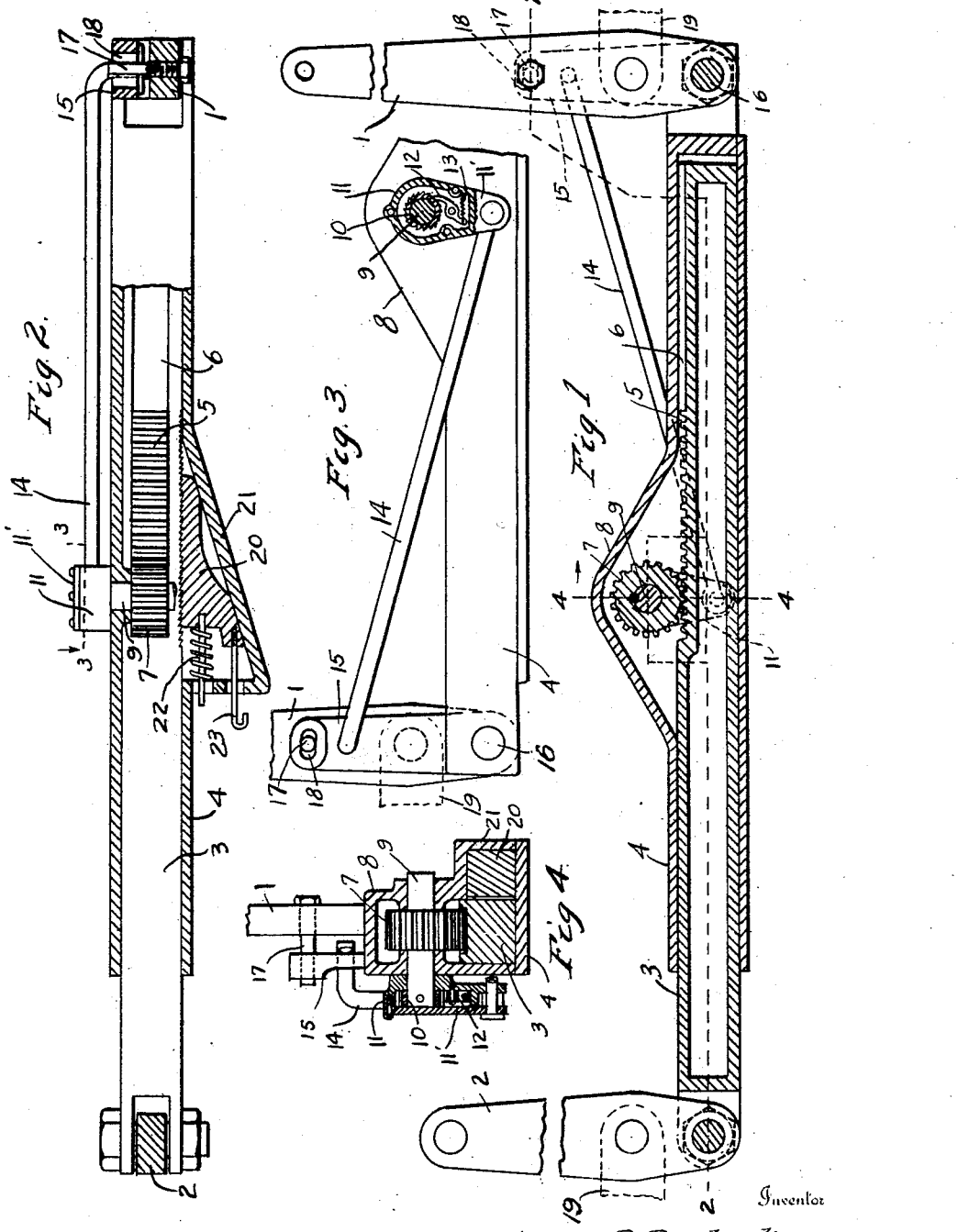

UNITED STATES PATENT OFFICE.

AMEL B. BROLUSKA, OF DETROIT, MICHIGAN.

SLACK ADJUSTER FOR VEHICLE BRAKES.

1,409,996.   Specification of Letters Patent.   Patented Mar. 21, 1922.

Application filed May 2, 1921. Serial No. 465,972.

*To all whom it may concern:*

Be it known that I, AMEL B. BROLUSKA, a citizen of the United States, residing at Detroit, in the county of Wayne and State of Michigan, have invented a new and useful Slack Adjuster for Vehicle Brakes, of which the following is a specification.

This invention relates to slack adjusters for vehicle brakes, and more particularly for the brakes of railway cars.

It is the object of the invention to provide an adjusting device for automatically taking up the slack in the actuating mechanism of car brakes resulting from wear of the brake shoes upon the wheels.

In attaining this object the invention contemplates the provision of a telescopic two-part thrust bar connecting elements of the mechanism which react upon each other in undergoing an application and release of the brakes, so as to effect an elongation adjustment of said thrust bar when a predetermined amount of slack has resulted from wear on the brake shoes, by means of a gear and rack mechanism actuable by the excess movement to which one of the brake levers is subjected as the result of such slack.

A further feature of the invention is the provision of means to maintain the adjusted relation of the telescopic members without imposing an undue stress upon the automatic adjusting means.

A preferred embodiment of the invention is hereinafter described and is illustrated in the accompanying drawing, wherein, Fig. 1 is a longitudinal vertical sectional view of a brake mechanism, having the improved automatic slack adjustment feature, the illustrated positions of the parts corresponding to normal of released positions of the brakes.

Fig. 2 is a view of the same in horizontal section, the section being taken upon line 2—2 of Fig. 1.

Fig. 3 is a side view of an end portion of the thrust bar, illustrating particularly the automatic adjustment device, a portion of the latter being in section as indicated by line 3—3 of Fig. 2.

Fig. 4 is a cross-section view taken upon line 4—4 of Fig. 1.

In these views the reference characters 1 and 2 designate respectively the usual actuating and actuated brake levers, and 3 and 4 indicate inner and outer telescoping members which form an adjustable connection between the lower ends of said levers, replacing the usual thrust bar. The top of the inner member 3 is formed with a longitudinal rack 5 in a substantially central portion of said member and is further formed with a channel 6 extending from said rack to one end of said member. The rack 5 is engaged by a pinion 7 housed within a central enlargement 8 of the outer member 4, and fast upon a stub shaft 9 journaled in the side walls of said enlargement, as best seen in Fig. 4. Said stub shaft projects at one end exteriorly of said enlargement and carries a ratchet-wheel 10 fast upon said shaft. Said ratchet-wheel, as may best be seen in Fig. 3, is located within a chambered rock arm 11 loose upon said shaft and projecting downwardly therefrom. Said arm is provided with a cover plate 11' for the chamber receiving said ratchet-wheel, said plate being removably secured to the arm by any suitable means. Within the chamber of the arm 11 there is also pivotally mounted a pawl 12 and a coiled spring 13 urging said pawl into engagement with the ratchet wheel. 14 is a rod which is terminally pivotally connected respectively to the lower end of the arm 11 and to the upper portion of an arm 15, the lower end of which is mounted at 16 co-pivotally with the lever 1 upon the member 4. The upper extremity of the arm 15 has a lost motion connection with the lever 1, established by a pin 17 laterally projecting from said lever and engaging in a slot 18 transversely formed in said arm. The brake beam connections to the levers 1 and 2 are indicated in dash lines at 19.

Considering now the operation of the device, as so far described, it will be understood by those familiar with the art that the actuating lever 1 is swung to the right (referring to Fig. 1) in applying the brakes, the pivot member 16 initially providing a fulcrum for this movement, and the brake beam connection 19 forming a fulcrum member driving the latter portion of the stroke of the lever. While said lever is fulcruming upon the brake beam connection the thrust bar formed by the members 3 and 4 is being shifted to the left (see Fig. 1) rocking the secondary lever 2 and actuating the brake beam connected to said lever in a direction opposite to that previously imparted to the other brake beam. Prior to any taking up of slack due to wear, the angular movement of the lever 1, requisite to fully apply the brakes, does not affect the arm 15, the pin 17 carried by the lever 1 having merely a lost motion movement in the slot 18 of said arm. As the bearing faces of the brake shoes (not shown) are gradually worn away, however, the angular travel of the lever 1 in applying the brakes is correspondingly increased, and the invention utilizes this effect upon said lever to take up the slack resulting from wear. Thus the slot 18 is so proportioned in length that a predetermined slight increase in the angular movement of the lever 1 will engage the pin 17 with the right-hand extremity of the slot 18 (see Fig. 1) and shift the arm 15 more or less to the right as the brakes are applied. Such action of the arm 15 will result in a pull being exerted through the rod 14 upon the arm 11 which will be swung toward the arm 15, and through a somewhat greater angular distance than the arm 15, since the latter is the longer. Thus the pawl 12 will be caused to ride over the teeth of the ratchet wheel 10 counter to the direction of actuation of the latter. Upon releasing of the brakes the arm 15 will be reversely actuated, after taking up of the lost motion between the lever 1 and said arm, and a reverse swinging movement of the arm 11 will be effected by the rod 14. During this reverse movement of said arm, the pawl 12 has driving engagement with the ratchet wheel 10, and through the latter the pinion 7 is turned in such a direction as to actuate the member 3 to the left (see Fig. 1), effecting a predetermined elongation of the members 3, 4, and thereby taking up the slack.

In order to maintain the members 3 and 4 in their adjusted relation without unduly stressing the mechanism affecting their adjustment there is provided a wedge-shaped detent 20 arranged at one side of the member 3 within a correspondingly shaped housing 21 of the member 4. The engaging faces of said detent and the member 3 are formed with vertical ratchet-toothed serrations permitting movement of the member 3 to the left (see Fig. 1) but resisting reverse movement of said member. Said detent wedges in the housing 21 in resisting movement of said member 3 to the right, and may be shifted slightly toward the larger end of said housing to clear the teeth of the member 3 when desirous of releasing the latter. A coiled spring 22 urges said detent toward the reduced end of the housing 21 and into normal interlocking engagement with the member 3. A hooked pin 23 secured to said detent projects freely through the larger end of the housing 21, providing for release of said detent from the member 3 in case it is desired manually to effect an adjustment in the length of the bar 3, 4.

It is a feature of the described invention that the adjustment for taking up slack is effected during releasing of the brakes rather than during application thereof, when the thrust bar is under stress and offers a resistance to elongation which must be overcome by the adjusting mechanism.

A further desirable feature is the employment of the detent for maintaining the adjusted position of the parts 3, 4 independently of the mechanism affecting their adjustment.

What I claim is:

1. In a slack take-up mechanism for vehicle brakes, inner and outer telescopically engaged members, a rack of transverse teeth longitudinally extending upon the inner of said members, a pinion engaging said rack, a housing integral with the outer member, receiving said pinion, a shaft carrying said pinion journaled in said housing, an actuating member for said shaft having a lost motion drive connection with said lever establishing a drive to said member from said lever only upon abnormal angular movement of the latter, a wedge shaped serrated dentent engaging a serrated face of the inner telescopic member to maintain any adjustment thereof with relation to the outer member, a correspondingly shaped housing integral with the outer member receiving said detent, and a spring urging said detent toward the reduced end of said housing and into interlocking engagement with said inner member.

2. In a slack take-up mechanism for vehicle brakes, a brake lever, a thrust bar connected thereto comprising a pair of telescopically engaged members, a rack of transverse teeth longitudinally extending upon one of said members, a pinion engaging said rack, a shaft journaled upon the other of said members carrying said pinion, a ratchet wheel fast upon said shaft, an arm pivoted upon said shaft, a pawl carried by said arm engaging said ratchet wheel, a second arm co-pivotal with said lever, a rod for actuating the first mentioned from the last mentioned arm, means establishing a lost motion drive connection from said lever to the arm co-pivotal therewith, establishing a drive only upon an abnormal angular movement of the lever, and means independent of said pawl for maintaining relative adjustment of the telescopically engaged members.

In testimony whereof I sign this specification.

AMEL B. BROLUSKA.